W. F. DUSENBURY.
Carriage-Spring.

No. 162,278.　　　　　　　　　Patented April 20, 1875.

WITNESSES:
A. W. Almqvist
A. F. Terry

INVENTOR:
W. F. Dusenbury
BY
ATTORNEYS.

THE GRAPHIC CO. PHOTO-LITH. 39 & 41 PARK PLACE, N.Y.

UNITED STATES PATENT OFFICE.

WILLIAM F. DUSENBURY, OF NEW YORK, N. Y.

IMPROVEMENT IN CARRIAGE-SPRINGS.

Specification forming part of Letters Patent No. 162,278, dated April 20, 1875; application filed February 5, 1875.

*To all whom it may concern:*

Figure 1:
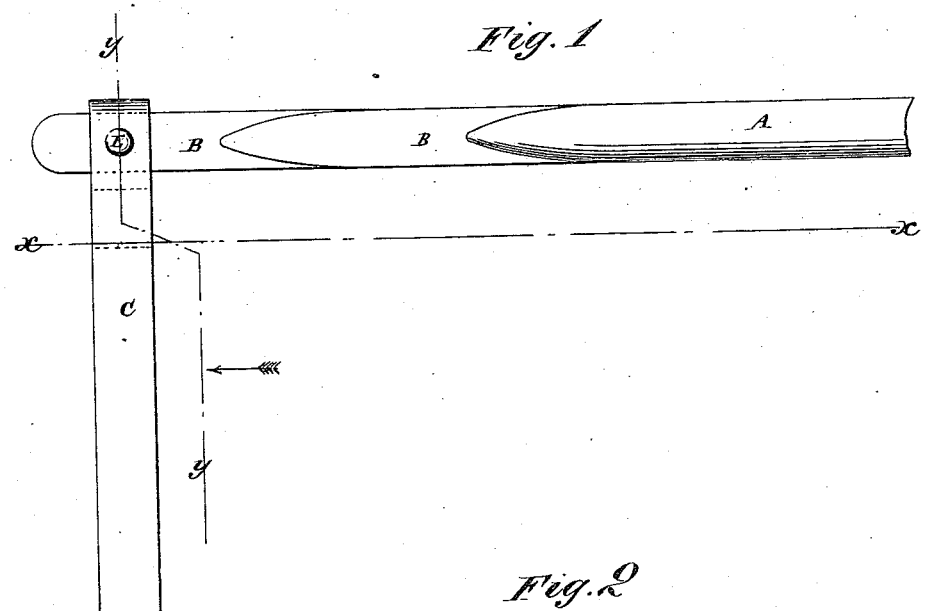
Figure 2:
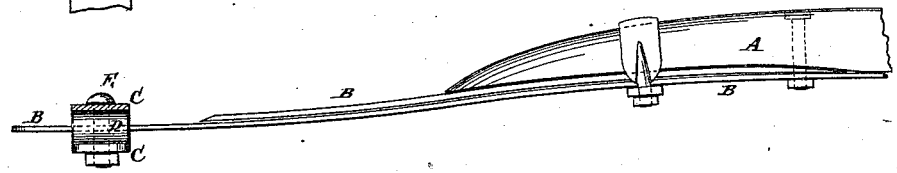
Figure 3:

Be it known that I, WILLIAM FRANK DUSENBURY, of the city, county, and State of New York, have invented a new and useful Improvement in Side-Bar Wagons, of which the following is a specification:

Figure 1 is a top view of a part of a side-bar and cross-spring, illustrating my invention. Fig. 2 is a side view of the same, partly in section through the line $x\ x$, Fig. 1. Fig. 3 is a detail sectional view of the same taken through the line $y\ y$, Fig. 1.

Similar letters of reference indicate corresponding parts.

The invention will first be fully described, and then pointed out in the claims.

A is the wooden part of the side bar, which is made shorter than the space between the cross-springs of the wagon, and to its lower side is secured, by bolts or clips, either or both, a steel spring, B, which may be made with one, two, or more leaves, and which projects beyond the ends of the wooden part of said side bar so as to be connected with the ends of the cross-springs C. The cross-springs C may be made with one, two, or more leaves, and their ends are bent over, so as to be parallel with the body of the said spring. D is a rubber block through which the end of the spring B passes, and which is placed in the hook of the cross spring C. The ends of the springs B C, and the rubber blocks D, are then secured to each other by a bolt, E, passing through said parts. The rubber-blocks D prevent the springs B C from coming in contact with each other, and thus prevent wear and rattling, while at the same time they give greater elasticity to the wagon. If desired, the cross-springs C may be made without hooks. In this case, the rubber-blocks D are laid upon the upper side of the ends of the springs C, and the ends of the springs B are laid upon the said rubber blocks D.

With this construction the bolt E would not form a sufficiently firm connection, but a clip should be used. The ends of the springs B may project and may have ornaments attached to them.

Having thus described my invention, I claim as new and desire to secure by Letters Patent—

1. The combination, with a side spring, B, cross-spring C, and rubber spring D, of a single bolt, E, as and for the purpose specified.

2. The combination of the rubber blocks D, with the ends of the cross-springs C, and the ends of the steel springs B of the side bars A B, substantially as shown and described.

WM. F. DUSENBURY.

Witnesses:
   JAMES T. GRAHAM,
   T. B. MOSHER.